(12) United States Patent
Heumann et al.

(10) Patent No.: US 6,686,752 B1
(45) Date of Patent: Feb. 3, 2004

(54) WEAR INDICATOR FOR REFRACTORY LININGS

(75) Inventors: William L. Heumann, Prospect, KY (US); Frank Elvin, Houston, TX (US); Russell J. Lewis, Lebanon, PA (US); Edwin D. Tenney, Annville, PA (US); Joseph A. Urban, Lebanon, PA (US); Mark T. Noppenberger, Etters, PA (US); James F. Miller, Lebanon, PA (US)

(73) Assignee: Fisher-Klosterman, Inc., Louisville, KY (US)

( * ) Notice: Subject to any disclaimer, the term of this patent is extended or adjusted under 35 U.S.C. 154(b) by 0 days.

(21) Appl. No.: 10/175,595

(22) Filed: Jun. 19, 2002

(51) Int. Cl.⁷ .................. G01R 27/08; G01N 27/00; G01N 17/04; B01D 45/00
(52) U.S. Cl. .................. 324/700; 324/71.2; 73/7; 55/435
(58) Field of Search .................. 324/700, 716, 324/71.2, 71.1, 693, 511, 517; 73/86, 7; 55/435, 434.1, 434.4; 374/7; 95/1; 96/417

(56) References Cited

U.S. PATENT DOCUMENTS

| | | | |
|---|---|---|---|
| 2,915,305 A | 12/1959 | Craig | 266/99 |
| 3,078,707 A * | 2/1963 | Weaver | 73/7 |
| 4,092,848 A | 6/1978 | Thomas | 73/86 |
| 4,103,539 A * | 8/1978 | Worley | 73/86 |
| 4,269,397 A | 5/1981 | Strimple et al. | 266/44 |
| 4,646,001 A | 2/1987 | Baldwin et al. | 324/700 |
| 6,208,128 B1 * | 3/2001 | Braconnier et al. | 324/71.2 |
| 6,265,880 B1 | 7/2001 | Born et al. | 324/541 |

FOREIGN PATENT DOCUMENTS

| | | |
|---|---|---|
| GB | 1 341 814 | 12/1973 |
| GB | 1 603 741 | 11/1981 |

* cited by examiner

Primary Examiner—Anjan K. Deb
(74) Attorney, Agent, or Firm—Camoriano and Associates; Theresa Fritz Camoriano; Guillermo Camoriano

(57) ABSTRACT

A vessel, as for a cyclone separator, includes a continuous electrical conductor embedded in the wall of the vessel for sensing when the lining has eroded.

19 Claims, 2 Drawing Sheets

WEAR INDICATOR FOR REFRACTORY LININGS

BACKGROUND OF THE INVENTION

The present invention relates to erosion or wear indicators on refractory linings. More particularly, it relates to an electrical conductor embedded in a refractory or liner in a vessel, wherein the continuity of the conductor is monitored such that, when the refractory or liner is worn beyond the level at which the conductor is embedded, the conductor is also eroded, either increasing the resistance of the conductor, or completely breaking the conductor (creating an infinite resistance) and indicating an open circuit.

It is understood that this invention may be used in any vessel where it is advantageous to monitor the wear on the vessel liner so that a scheduled repair or replacement may be implemented, instead of an unscheduled emergency shutdown.

Cyclone separators are often used as primary gas pollution control equipment, ahead of baghouses, for instance, to knock out the larger particles and reduce the particulate loading on the baghouse. The abrasive action of the particles, swirling in a spiral path at high velocity against the inside wall of the cyclone separator, results in accelerated erosion, which can result in sudden failure of the cyclone separator.

If the system needs to undergo an emergency shutdown, it may be difficult to start the system up again, especially in systems which operate at high temperatures, where the product being processed may solidify at ambient temperatures. Advance notice of the impending failure of the eroded part would be advantageous, both to prevent damage to the vessel and so that a planned shutdown for maintenance can be scheduled.

SUMMARY OF THE INVENTION

The present invention provides a conductor wire embedded in the refractory or liner (hereinafter collectively referred to as "refractory lining" or "refractory") of the vessel to be monitored for wear. As erosion wears the refractory, the conductor wire will eventually be exposed to the abrasive action of the gas flow stream, and it will also be subject to erosion. A simple ohmmeter connected at the two ends of the wire monitors the conductivity (or resistivity) of the wire circuit. When the wire is intact, the resistance is very low. As the wire erodes, the resistance increases. Once the wire is severed by the action of the erosion, the resistance goes to infinity, indicating an open circuit.

Monitoring with the ohmmeter may be continuous, or it may be on an intermittent basis, such as once a shift. When the meter first indicates a change in conductivity, the operator takes note and can decide when to schedule a planned shutdown for repairs. If the wire was buried approximately halfway between the original, inner exposed wall of the refractory and the inner wall of the vessel, and it took, for instance, six months to begin to erode the wire or to reach the "broken wire" condition, then the operator may reasonably assume that it will be approximately six more months before all the refractory is fully eroded and the cyclone separator wall itself will be under attack.

He can then schedule maintenance accordingly.

It should be noted that the conductor wire embedded in the refractory or liner preferably is an electrically insulated conductor to ensure that the conductor itself does not short out against the vessel wall or against metal clips which may be used to secure the refractory against the vessel wall, giving a false continuity indication of the conductor. Also, the conductor wire preferably extends along a substantial vertical distance of the vessel, increasing the likelihood that wear of the vessel will be sensed by the conductor wire, as opposed to many prior art sensors, which are located at only a single point in the vessel.

DESCRIPTION OF THE PREFERRED EMBODIMENT

Figure 1:
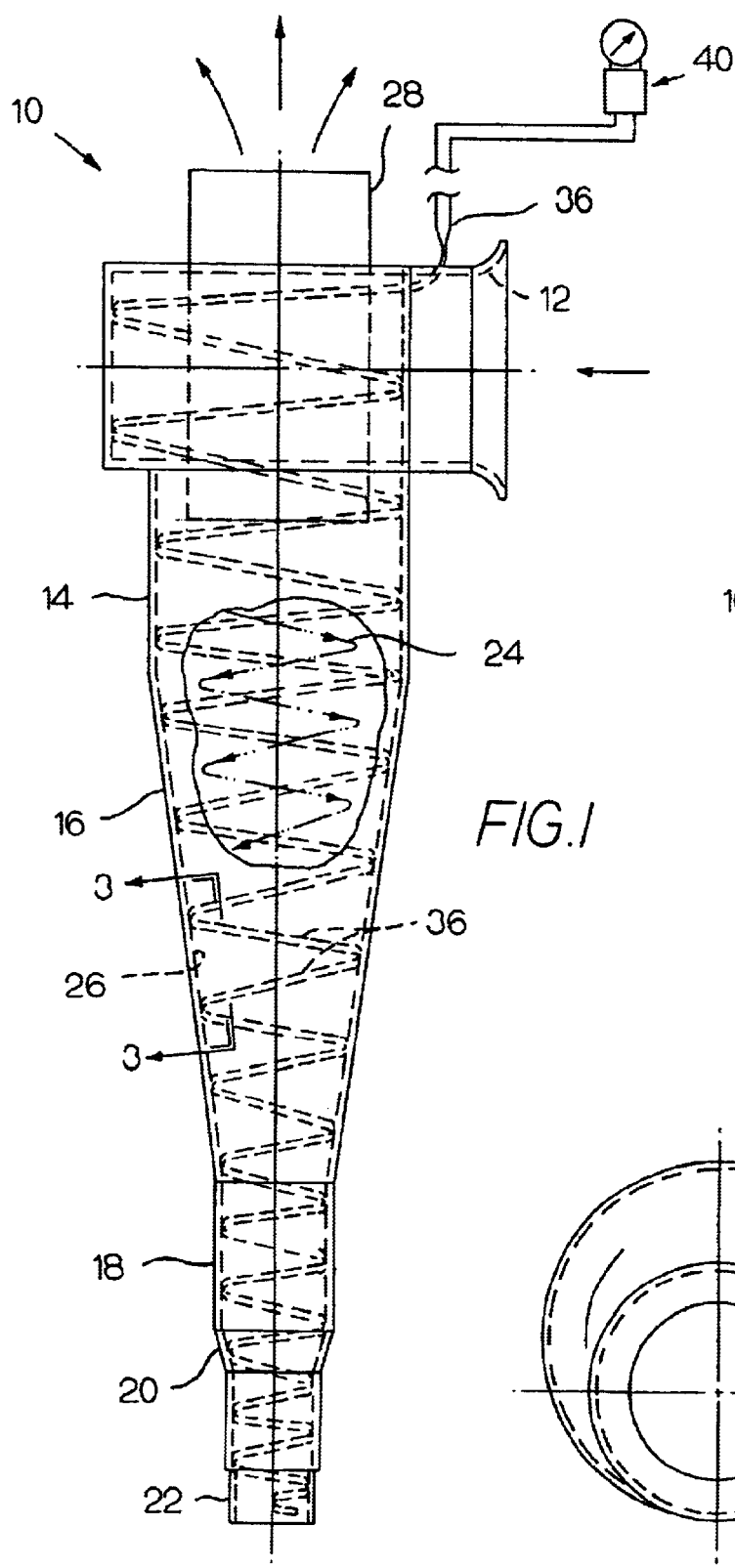
FIG. 1 is a side view, with a cut-away section, of a cyclone separator made in accordance with the present invention, with the embedded wires shown in phantom.

FIG. 1 shows an example of one cyclone separator 10 made in accordance with the present invention. The cyclone separator 10 typically includes a tangential inlet 12 to allow particulate laden gas to enter the body of the cyclone separator 10. The body of the cyclone separator 10 comprises an upper cylindrical section 14 connected to an intermediate frustroconical section 16 (hereinafter referred to simply as the conical section 16), followed by a lower cylindrical section 18. A cylindrical solids' outlet section 22 is connected to the lower cylindrical section 18 via a concentric reducer 20. A cylindrical clean-gas-outlet section 28 is located at the top of the cyclone separator 10, and this outlet section 28 extends a distance into the body of the cyclone separator 10 as shown in FIG. 1. Typically, particulate laden gas is drawn into and through the cyclone separator 10 by a fan (not shown) located downstream of the cyclone separator 10 and connected to the outlet section 28.

As the gas enters the cyclone separator 10, the tangential inlet section 12 induces a swirling action to the gas. As more gas enters the cyclone separator 10, it displaces the gas already in the cyclone separator 10, causing it to move downwardly along the inside wall 26 of the conical section 16. This creates a downwardly spiraling vortex 24. As the cross-sectional area of the conical section 16 decreases, the velocity of the gas flow increases, which increases the centrifugal forces acting on the dust particles carried by the gas flow, forcing these particles against the inside wall 26 of the conical section 16. These dust particles are carried down along the inside wall 26, and, in a properly sized and designed cyclone separator 10, these dust particles are deposited into the cylindrical section 18 (to be evacuated via the solids' outlet section 22) while the gas flow makes a sharp change in direction to flow up through the central axis of the cyclone separator 10 and out the outlet section 28.

Figure 3:
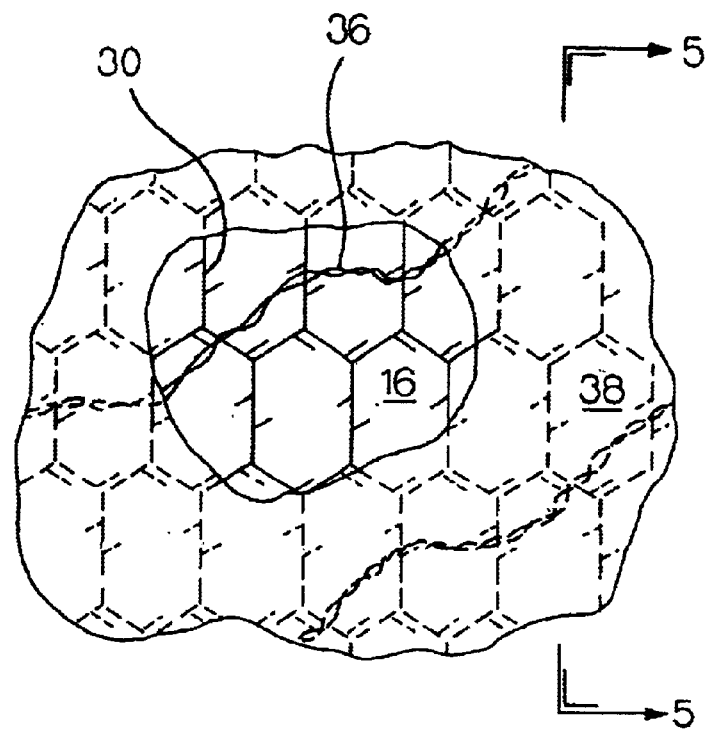
FIG. 3 is a cut-away view along line 3—3 of FIG. 1.
Figure 4:
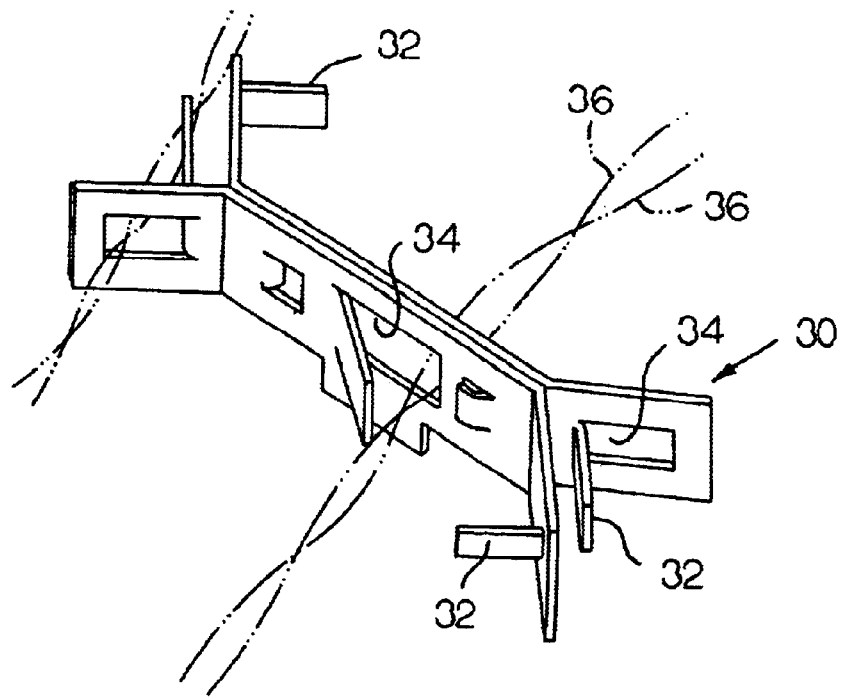
FIG. 4 is a perspective view of one of the "clips" forming the honeycomb structure for the refractory shown in FIG. 3.

The dust particles impinge against the walls of the cyclone separator 10, and the abrasiveness of these particles, compounded by the high velocity with which they are conveyed within the cyclone separator 10, results in accelerated erosion of the inside walls of the cyclone separator 10. To counter this erosion (and also for thermal insulation), it is customary to line the inside walls of the cyclone separator 10 with a refractory liner 38. FIG. 3 shows a typical application of the refractory 38 to a vessel wall. Metal clips 30 similar to those depicted in FIG. 4 are attached, by welding for instance, to the inside wall 26 of the cyclone separator 10 in the form of a honeycomb-shaped structure as shown in FIG. 3. This forms a support structure for supporting the refractory. The refractory 38, which resembles a putty-like substance as it is applied, may be troweled or "gunited" onto this honeycomb structure, where it will solidify and cure. The refractory 38 adheres to the clips 30 in the honeycomb structure while the extended metal surfaces 32 (See FIG. 4), and the holes 34 in the clips 30 serve as additional anchor points for the refractory 38 to latch onto the clips 30.

Figure 5:
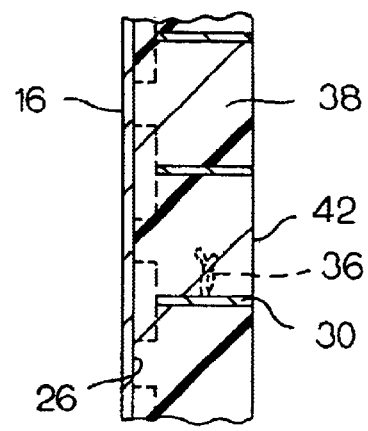
FIG. 5 is a detailed cut-away view along line 5—5 of FIG. 3.
Figure 2:
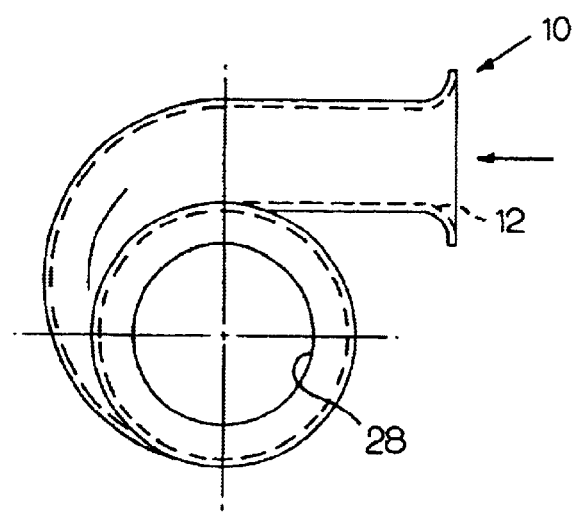
FIG. 2 is a plan view of the cyclone separator of FIG. 1.

In one embodiment of the present invention, once the clips 30 are attached to the inside wall of the cyclone separator 10, a pair of wires 36 is fed through the holes 34 of the various clips 30, so that the wires 36 wind around the inside wall of the cyclone separator 10 in a spiral pattern as shown in FIG. 1. As shown in FIG. 5, the conductor wires 36 preferably are embedded so that they lie a fixed distance between the inner surface 42 of the refractory 38 and the inner surface 26 of the cyclone wall. Preferably, the spiral pattern formed by the wires is offset from and in counter direction to the downwardly spiraling vortex 24 formed by the gas flow stream, so that the path of the gas flow stream intersects or cuts across the spiral path of the wires 36 at various heights along the vessel (as seen in FIG. 1). This increases the likelihood that wear at any height along the vessel wall will be sensed by the conductor 36.

When the gas flow stream has eroded the refractory 38 to the point where the wires 36 are exposed, the gas flow stream cuts across the wires 36 for maximum erosive effect on the wires 36. At one end of the cyclone separator 10, the wires 36 are spliced together (In FIG. 1 they are spliced together at the bottom of the cyclone separator 10), and the wires 36 extending from the opposite end of the cyclone separator 10 are connected to an ohmmeter to measure resistance across the circuit.

In the embodiment depicted here, a pair of wires 36 spirals upwardly within the cyclone separator 10 with the wires 36 spliced at one end and connected to the ohmmeter 40 at the other end. However, this could be a single wire 36, and the ohmmeter 40 could be connected to the two ends of the wire 36, where one end protrudes from the top of the cyclone separator 10 and the other end protrudes from the bottom of the cyclone separator 10.

The wire is preferably an electrically insulated conductor, especially in the instance where the vessel wall and/or the clips used to secure the refractory to the vessel wall are themselves electrically conductive (metallic, for instance). In the event that the refractory is used for a high temperature application, the electrically insulated conductor is chosen carefully to ensure that neither the electrical insulation nor the conductor itself will melt for the particular application. For high temperature applications in which the inside of the vessel is exposed to temperatures on the order of 1400° F., it is preferable to use electrically insulated conductors such as Ceramaflex® insulated thermocouple wire (Ceramaflex is a registered name of PMC, a Division of Rockbestos Surprenant Cable Corporation, located in Manchester, N.H. 03103) which can withstand continuous temperatures as high as 2,200° F.

Once the wire 36 is threaded through the holes 34 of the clips 30 (as shown in FIGS. 1 and 3), the putty-like refractory 38 is troweled, gunited, or otherwise applied to the honeycomb structure formed by the clips 30, filling the honeycomb structure and embedding the wire 36 beneath the inner surface of the refractory 38. The refractory then 38 cures. In the present embodiment, and as shown in FIG. 5, the wire 36 is embedded at a depth approximately halfway between the exposed inner surface 42 of the refractory 38 and the now covered inside wall 26 of the cyclone separator 10.

Once the cyclone separator 10, with the refractory 38 and the wire 36 is put into service, the date is noted. The ohmmeter 40 is connected to complete the electrical circuit, and a log is kept noting the days (or hours) of operation wherein the ohmmeter 40 continues to indicate low electrical resistance, implying that the wire 36 is still intact and thus that the refractory 38 has not eroded to the point where the wire 36 is exposed and subject to erosion. The ohmmeter 40 may be connected to the circuit continuously or intermittently, for instance once a day or once per shift. Once the ohmmeter 40 indicates a high resistance in the electrical circuit, this notifies the operator that the refractory 38 has eroded to the point where the wire 36 is exposed and is itself eroded.

If the wire 36 was originally embedded approximately half way between the exposed surface 42 of the refractory 38 and the now-covered inside surface 26 of the cyclone separator 10, then the operator may estimate that the cyclone separator 10 may continue to operate approximately as many days (or hours) as it has already operated since it was first put into operation, before erosion threatens the integrity of the cyclone separator 10 vessel. This gives the operator the opportunity to plan a maintenance shut-down to repair or replace the cyclone separator 10 and thus avoid an upset condition in the facility and an emergency shut down. Even if the wire 36 was not originally embedded approximately half way between the exposed surface 42 of the refractory 38 and the now-covered inside surface 26 of the cyclone separator 10, if the approximate initial location of the wire 36 is known, a reasonable estimate can be made of the life expectancy of the vessel before its failure. In any event, the present invention provides advanced warning of erosion to permit a planned shut down of the facility to repair or replace the vessel prior to its failure.

It should be noted that the ohmmeter 40 is only one possible means for sensing the continuity of the wire conductor 36 within the cyclone separator 10. Other known means may be used with equal success. For instance, instead of an ohmmeter, a power source (such as battery) and a light may be installed in series with the wire 36. As long as the wire 36 is not broken (and the power supply remains on) the light will shine. When the wire 36 breaks, the light will no longer shine, thereby alerting the operator. Other electrical arrangements are possible, via the use of solenoids, for instance, to turn on lights or audible alarms to alert the operator locally or remotely at a control room when the wire has eroded.

This arrangement allows an operator to monitor the degree of erosion in a vessel in order to anticipate when a scheduled shut-down will be required to repair or replace the vessel. It will be obvious to those skilled in the art that modifications may be made to the embodiments described above without departing from the scope of the present invention.

What is claimed is:

1. A method for sensing wear in a refractory lining in a vessel, comprising the steps of:

installing a refractory support structure along the inside wall of a vessel having a height by securing said refractory support structure to the inside wall of the vessel to form a honeycomb-shaped structure defining a plurality of open cells;

threading an elongated conductor through said honeycomb-shaped refractory support structure so that said conductor extends through a substantial portion of the height of said vessel;

applying a refractory to said refractory support structure so as to fill said honeycomb-shaped structure with refractory and so as to embed said refractory support structure and said conductor inside said refractory; and connecting a means for sensing continuity across said conductor such that, as said refractory erodes due to an erosive action, said conductor is exposed to said erosive action, which is sensed by said means for sensing continuity.

2. A method for sensing wear as recited in claim 1, wherein said conductor defines at least two electrically interconnected ends, and said means for sensing conductivity is an ohmmeter connected across said two ends.

3. A method for sensing wear in a refractory lining in a vessel as recited in claim 1, wherein said step of forming a honeycomb-shaped structure includes securing a plurality of clips to the inside wall of said vessel, said clips defining holes; and the step of threading an elongated conductor through said refractory support structure includes threading said conductor through said holes.

4. A method for sensing wear in a refractory lining in a vessel as recited in claim 3, wherein said conductor is embedded at a substantially uniform depth inside said refractory.

5. A method for sensing wear in a refractory lining in a vessel, comprising the steps of:

installing a refractory support structure along the inside wall of a vessel having a height;

threading an elongated conductor through said refractory support structure so that said conductor extends through a substantial portion of the height of said vessel;

applying a refractory to said refractory support structure so as to embed said conductor inside said refractory; and connecting a means for sensing continuity across said conductor such that, as said refractory erodes due to an erosive action, said conductor is exposed to said erosive action, which is sensed by said means for sensing continuity;

wherein said conductor is a wire, and said wire forms a first spiral path inside said wall of said vessel.

6. A method for sensing wear as recited in claim 5, wherein said vessel is a cyclone separator, through which gas flows along a second spiral path.

7. A method for sensing wear as recited in claim 6, wherein said first spiral path winds in a counter-direction to said second spiral so that said first and second spiral paths cross at various points along the height of said vessel.

8. A method for sensing wear as recited in claim 7, wherein said conductor is an electrically insulated conductor.

9. A method for sensing wear as recited in claim 8, wherein said electrically insulated conductor maintains its integrity at 1500° F.

10. A cyclone separator, comprising;

a housing wall, defining a tangential inlet section, a frustroconical section, and a height;

said housing wall also defining an inside surface and an outside surface;

a refractory support structure secured to said inside surface, said support structure defining openings;

a refractory applied to said refractory support structure; and a conductor threaded through said openings in said refractory support structure such that said conductor is embedded in said refractory and follows a first spiral path along a substantial portion of the height of said housing.

11. A cyclone separator as recited in claim 10, wherein a second spiral path is defined along the inside of said housing wall from the tangential inlet downwardly along the housing wall, and wherein said first and second spiral paths wind in counter direction to each other, so that said first and second spiral paths intersect at a plurality of points along the height of said vessel.

12. A cyclone separator as recited in claim 11, and further comprising means for sensing electrical continuity across said conductor for sensing whether the conductor has been eroded.

13. A cyclone separator as recited in claim 12, wherein said conductor is embedded at a substantially uniform depth inside said refractory.

14. A cyclone separator as recited in claim 12, wherein said conductor is a wire defining at least two ends, and said means for sensing electrical continuity across said conductor is an ohmmeter connected across said two ends.

15. A cyclone separator as recited in claim 14, wherein said conductor is an electrically insulated conductor.

16. A cyclone separator as recited in claim 15, wherein said electrically insulated conductor maintains its integrity at 1500° F.

17. A cyclone separator, comprising;

a housing, defining a tangential inlet section, an inside surface, an outside surface, and a frustroconical section, wherein a first spiral path is defined from said tangential inlet section downwardly along said inside surface;

a refractory liner along said inside surface;

a conductor, embedded in said refractory, wherein said conductor follows a second spiral path which winds in counter direction to said first spiral path; and means for sensing electrical continuity across said conductor wherein continuity is high when said conductor is embedded in said refractory, and continuity is low when said conductor becomes exposed to erosion.

18. A cyclone separator as recited in claim 17, wherein said conductor is an electrically insulated conductor.

19. A cyclone separator as recited in claim 18, wherein said electrically insulated conductor maintains its integrity at 1500° F.

* * * * *